US011067186B2

(12) United States Patent
Numazaki et al.

(10) Patent No.: US 11,067,186 B2
(45) Date of Patent: Jul. 20, 2021

(54) PRESSURE REDUCING VALVE

(71) Applicant: JTEKT CORPORATION, Osaka (JP)

(72) Inventors: Kazushi Numazaki, Toyota (JP);
Kazuhiro Takabayashi, Okazaki (JP);
Taizan Morita, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/796,994

(22) Filed: Feb. 21, 2020

(65) Prior Publication Data

US 2020/0271235 A1    Aug. 27, 2020

(30) Foreign Application Priority Data

Feb. 25, 2019    (JP) .............................. JP2019-031540

(51) Int. Cl.
    *F16K 17/04*    (2006.01)
(52) U.S. Cl.
    CPC ........ *F16K 17/0466* (2013.01); *F16K 17/044* (2013.01); *Y10T 137/7834* (2015.04); *Y10T 137/7869* (2015.04); *Y10T 137/7929* (2015.04)
(58) Field of Classification Search
    CPC .............. F16K 17/044; F16K 17/0466; Y10T 137/7834; Y10T 137/7869; Y10T 137/7929; Y10T 137/7835
    See application file for complete search history.

(56) References Cited

U.S. PATENT DOCUMENTS

| | | | | | |
|---|---|---|---|---|---|
| 2,855,950 | A | * | 10/1958 | Phillips | ................. G05D 16/10 137/505.28 |
| 2,888,949 | A | * | 6/1959 | Evans | .................... A62B 9/022 137/505.25 |
| 3,012,751 | A | * | 12/1961 | Hauser | .................. F16K 31/145 251/60 |
| 3,207,175 | A | * | 9/1965 | Pauly | ................. G05D 16/0694 137/505.46 |

(Continued)

FOREIGN PATENT DOCUMENTS

| FR | 1126884 A | 12/1956 |
|---|---|---|
| GB | 779909 A | 7/1957 |

(Continued)

OTHER PUBLICATIONS

Jul. 28, 2020 Search Report issued in European Patent Application No. 20158771.4.

*Primary Examiner* — Craig M Schneider
*Assistant Examiner* — Frederick D Soski
(74) *Attorney, Agent, or Firm* — Oliff PLC

(57) ABSTRACT

A pressure reducing valve includes a piston disposed in a cylinder chamber; a valve element that is coupled to the piston and opens and closes a valve seat; a valve spring that biases the valve element in a direction in which the valve element is moved away from the valve seat; and a biasing member that biases the valve seat toward a side opposite to the piston. The pressure reducing valve is configured to reduce a primary pressure of a fluid to a secondary pressure. The valve seat is disposed such that the valve seat recipro- (Continued)

cates in the same direction as a direction in which the valve element reciprocates in the primary pressure chamber. As a difference between the primary pressure and the secondary pressure increases, the valve seat moves toward the secondary pressure chamber.

1 Claim, 5 Drawing Sheets

(56) References Cited

U.S. PATENT DOCUMENTS

| | | | | |
|---|---|---|---|---|
| 3,211,175 A * | 10/1965 | Replogle | ................ | G05D 16/10 137/493 |
| 3,437,109 A * | 4/1969 | Egerer | ................ | G05D 16/103 137/505.25 |
| 3,512,550 A * | 5/1970 | Ammann | .............. | F16K 31/365 137/553 |
| 3,785,333 A * | 1/1974 | Warncke | ........... | A61M 16/0051 116/70 |
| 3,788,312 A * | 1/1974 | Sandstrom | ............. | A62B 9/006 128/202.22 |
| 3,910,222 A * | 10/1975 | Metivier | ............. | A61M 16/104 116/70 |
| 4,250,876 A * | 2/1981 | Kranz | .................... | A62B 9/027 128/202.22 |
| 4,274,435 A * | 6/1981 | Block | .................. | E21D 15/512 137/508 |
| 4,887,638 A * | 12/1989 | Hellquist | ................ | A62B 9/02 137/505.13 |
| 5,046,788 A * | 9/1991 | Lindenman | ............. | B60T 8/341 303/116.1 |
| 5,076,647 A * | 12/1991 | Grana | .................... | B60T 8/341 303/113.2 |
| 5,135,023 A * | 8/1992 | Ross | .................... | F17C 13/025 137/505.11 |
| 5,520,214 A * | 5/1996 | Mack | ..................... | F16K 1/306 137/505.34 |
| 5,662,100 A * | 9/1997 | Fox | ........................ | G05B 19/10 128/205.24 |
| 6,186,168 B1 * | 2/2001 | Schultz | ................ | G05D 16/109 137/505.11 |
| 6,321,779 B1 * | 11/2001 | Miller | .................. | G05D 16/109 137/340 |
| 6,495,032 B2 * | 12/2002 | Miller | .................. | G05D 16/109 210/130 |
| 7,089,940 B2 * | 8/2006 | Kellström | ........... | B63C 11/2209 128/205.24 |
| 7,159,611 B2 * | 1/2007 | Larsen | ................. | G05D 16/106 137/505.25 |
| 7,380,551 B2 * | 6/2008 | Alvey | ...................... | A62B 7/02 128/201.25 |
| 7,418,976 B2 * | 9/2008 | Henley | ................... | F16K 1/305 137/505 |
| 7,481,241 B2 * | 1/2009 | Carpenter | ............ | G05D 16/103 137/505.25 |
| 7,628,152 B2 * | 12/2009 | Patterson | ............... | A62B 9/022 128/200.29 |
| 7,647,927 B2 * | 1/2010 | Teetzel | ..................... | A62B 7/12 128/205.12 |
| 7,836,911 B2 * | 11/2010 | Arnott | .................. | G05D 16/106 137/116.5 |
| 8,327,877 B2 * | 12/2012 | Ito | ...................... | G05D 16/0655 137/505.25 |
| 8,424,561 B1 * | 4/2013 | Rowe | ................... | G05D 16/106 137/508 |
| 8,689,814 B2 * | 4/2014 | Arnott | ............... | G05D 16/0666 137/113 |
| 9,316,330 B2 * | 4/2016 | Woodford | ............... | E21B 34/08 |
| 10,852,753 B2 * | 12/2020 | Jung | ................... | G05D 16/103 |

FOREIGN PATENT DOCUMENTS

| JP | 2018-018374 A | 2/2018 |
|---|---|---|
| JP | 2018-060376 A | 4/2018 |

* cited by examiner

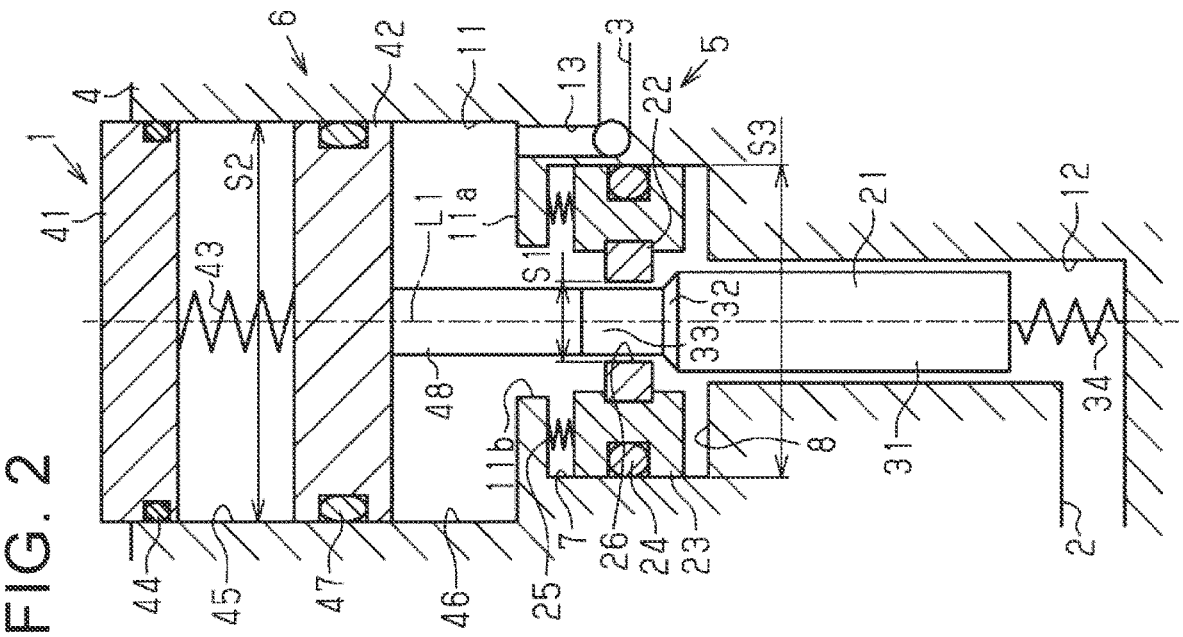
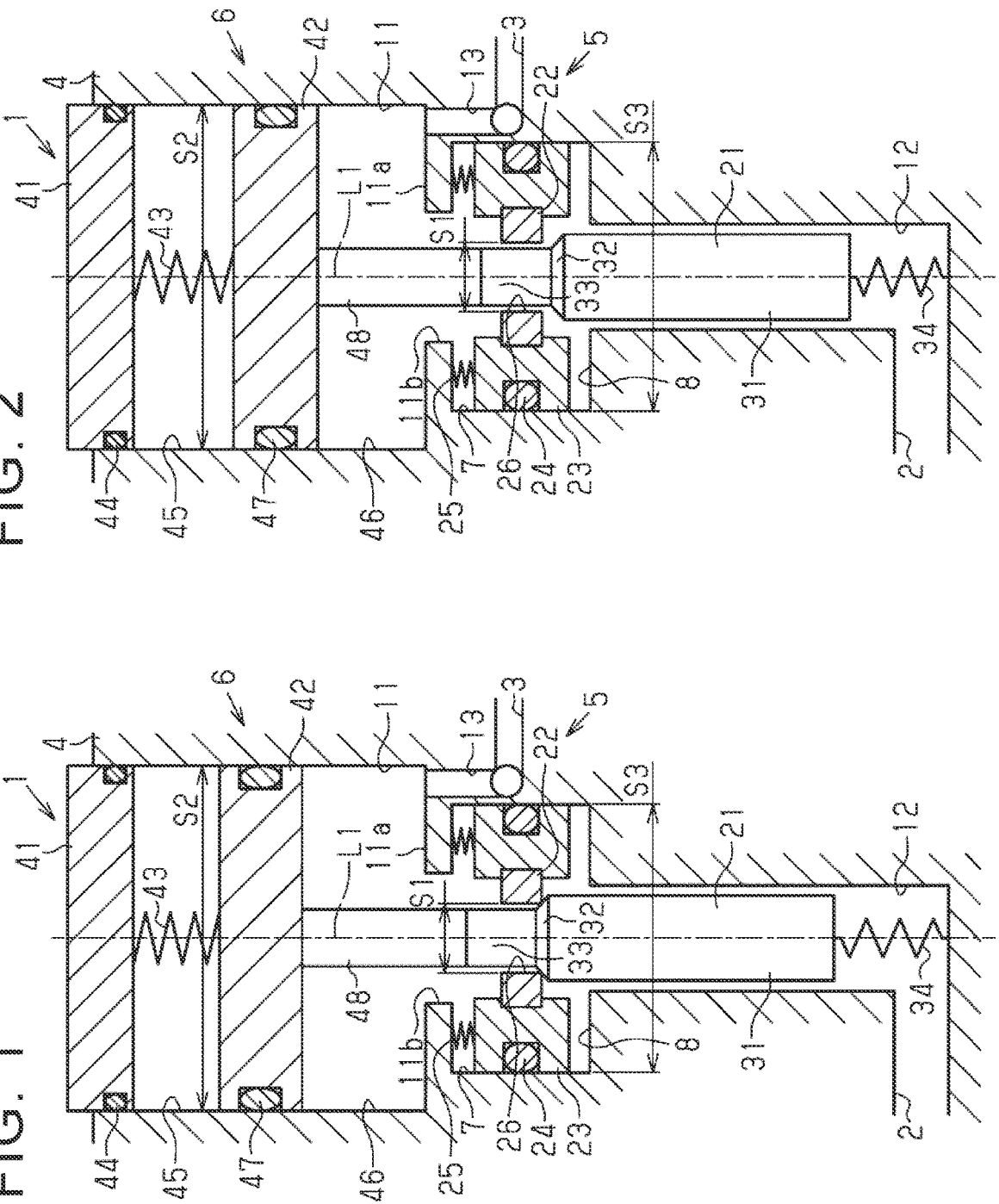

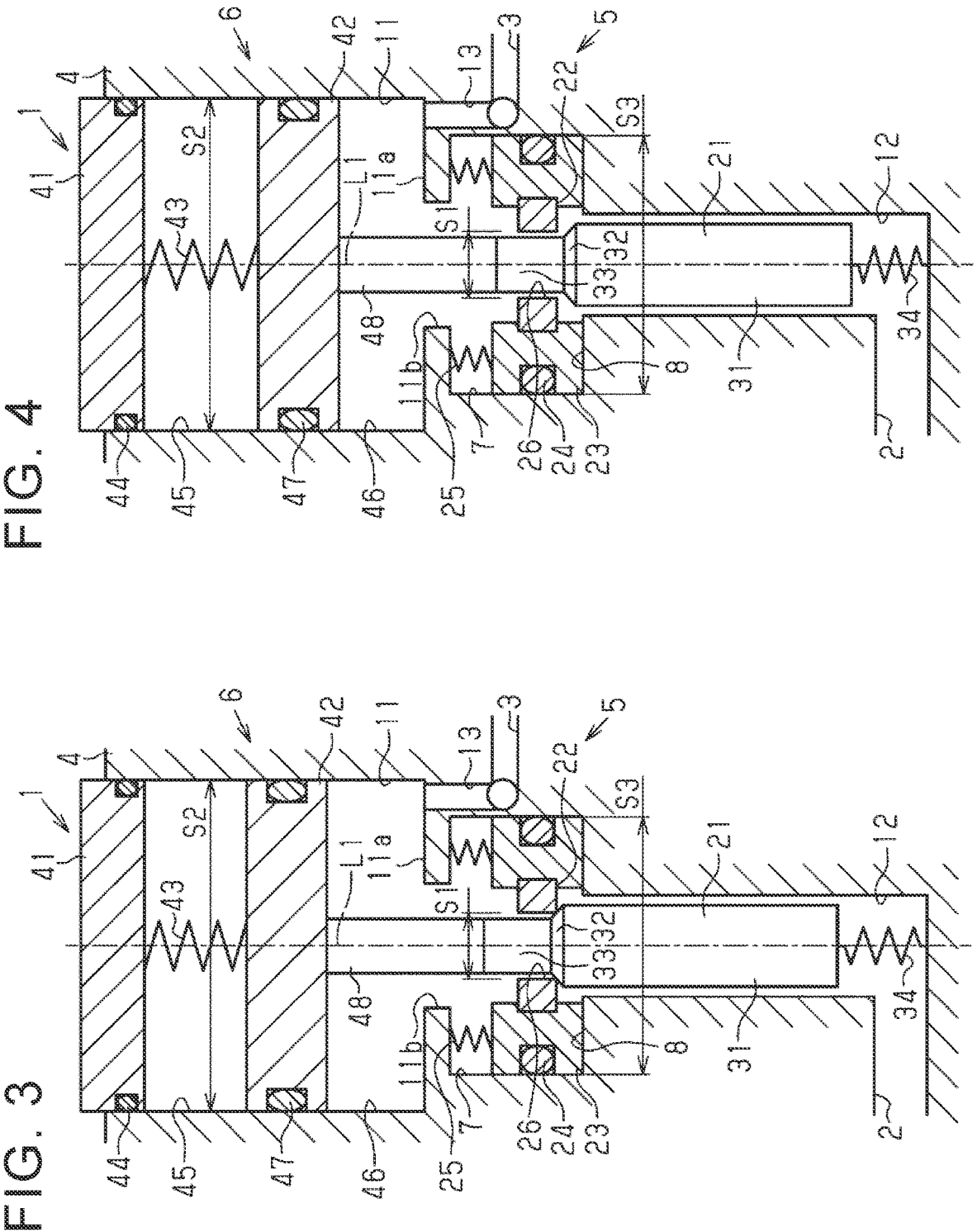

PRESSURE REDUCING VALVE

CROSS-REFERENCE TO RELATED APPLICATION

This application claims priority to Japanese Patent Application No. 2019-031540 filed on Feb. 25, 2019, incorporated herein by reference in its entirety.

BACKGROUND

1. Technical Field

The disclosure relates to a pressure reducing valve.

2. Description of Related Art

A pressure reducing valve includes a valve mechanism disposed between a primary port and a secondary port in a housing. A valve element of the valve mechanism comes into and out of contact with a valve seat. As the valve element comes into and out of contact with the valve seat, the amount of opening (opening degree) of the valve mechanism changes accordingly. The amount of opening of the valve mechanism is adjusted to reduce the pressure of a primary pressure gas flowing in through the primary port to a secondary pressure such that the pressure of the gas fed through the secondary port does not become higher than a predetermined pressure (as described in each of Japanese Unexamined Patent Application Publication No. 2018-60376 and Japanese Unexamined Patent Application Publication No. 2018-18374).

Specifically, such a pressure reducing valve includes a piston disposed in a cylinder chamber such that the piston reciprocates; a valve element that is coupled to the piston and opens and closes a valve seat; and a valve spring that biases the valve element in the direction in which the valve element is moved away from the valve seat. The piston divides the cylinder chamber into two chambers. The pressure reducing valve reduces a primary pressure of a fluid, which flows from a primary pressure chamber into one (a secondary pressure chamber) of the two chambers of the cylinder chamber through clearance between the valve element and the valve seat, to a secondary pressure.

When a gas is supplied, the pressure reducing valve closes as the piston operates against the valve spring after the gas is fed to the secondary side. At this time, the primary pressure increases. In the pressure reducing valve in related art, stability of the secondary pressure against such variation in primary pressure is improved, namely variation in secondary pressure due to such variation in primary pressure is reduced, by reducing the ratio of the diameter of a valve hole to the diameter of the piston coupled to the valve element (i.e., by increasing the piston diameter) so as to minimize the force against the force generated by the difference between the primary and secondary pressures.

In technical fields where the secondary pressure is required to be higher than the secondary pressure that is currently used, for example, in fuel cell vehicles, a tank storing a gas has a higher pressure (tank pressure). Pressure reducing valves with a high pressure reduction ratio are thus desired.

SUMMARY

Moreover, pressure reducing valves with a high pressure reduction ratio are desired which provide a secondary pressure as low as in related art and reduce variation in secondary pressure, namely achieve stability of the secondary pressure.

The disclosure provides a pressure reducing valve that achieves stability of a secondary pressure without increasing a piston diameter.

A pressure reducing valve according to an aspect of the disclosure includes a piston disposed in a cylinder chamber such that the piston reciprocates; a valve element that is coupled to the piston and opens and closes a valve seat; a valve spring that biases the valve element in a direction in which the valve element is moved away from the valve seat; and a biasing member that biases the valve seat toward a side opposite to the piston. The pressure reducing valve is configured to reduce a primary pressure of a fluid to a secondary pressure, the fluid flowing from a primary pressure chamber into a secondary pressure chamber of the cylinder chamber through clearance between the valve element and the valve seat. The valve seat is disposed such that the valve seat reciprocates in the same direction as a direction in which the valve element reciprocates in the primary pressure chamber. As a difference between the primary pressure and the secondary pressure increases, the valve seat moves toward the secondary pressure chamber.

With the above configuration, as the difference between the primary pressure and the secondary pressure increases, the valve seat moves toward the secondary pressure chamber. As a result, a set load of the valve spring is changed. Therefore, stability of the secondary pressure is achieved without increasing the piston diameter.

The valve element may be disposed in the primary pressure chamber. With this configuration, the above effect is achieved in the pressure reducing valve in which the valve element is disposed in the primary pressure chamber.

The valve element may be disposed at a position closer to the secondary pressure chamber than the valve seat is. With this configuration, the above effect is achieved in the pressure reducing valve in which the valve element is disposed at a position closer to the secondary pressure chamber than the valve seat is.

The pressure reducing valve according to the above aspect may further include a valve seat holder configured to hold the valve seat and configured to be movable together with the valve seat. With this configuration, the above effect is achieved in the pressure reducing valve including the valve seat holder configured to hold the valve seat.

According to the above aspect of the disclosure, stability of the secondary pressure is achieved without increasing the piston diameter.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a sectional view of a pressure reducing valve of a first embodiment which is in a closed state with a valve seat holder moved toward a cylinder chamber due to a large difference between a primary pressure and a secondary pressure;

FIG. 2 is a sectional view of the pressure reducing valve of the first embodiment which is opened with the valve seat holder moved toward the cylinder chamber due to a large difference between the primary pressure and the secondary pressure;

FIG. 3 is a sectional view of the pressure reducing valve of the first embodiment which is in a closed state with the valve seat holder moved toward the side opposite to the cylinder chamber due to a small difference between the primary pressure and the secondary pressure;

FIG. 4 is a sectional view of the pressure reducing valve of the first embodiment which is opened with the valve seat holder moved toward the side opposite to the cylinder chamber due to a small difference between the primary pressure and the secondary pressure;

DETAILED DESCRIPTION OF EMBODIMENTS

Figure 5:
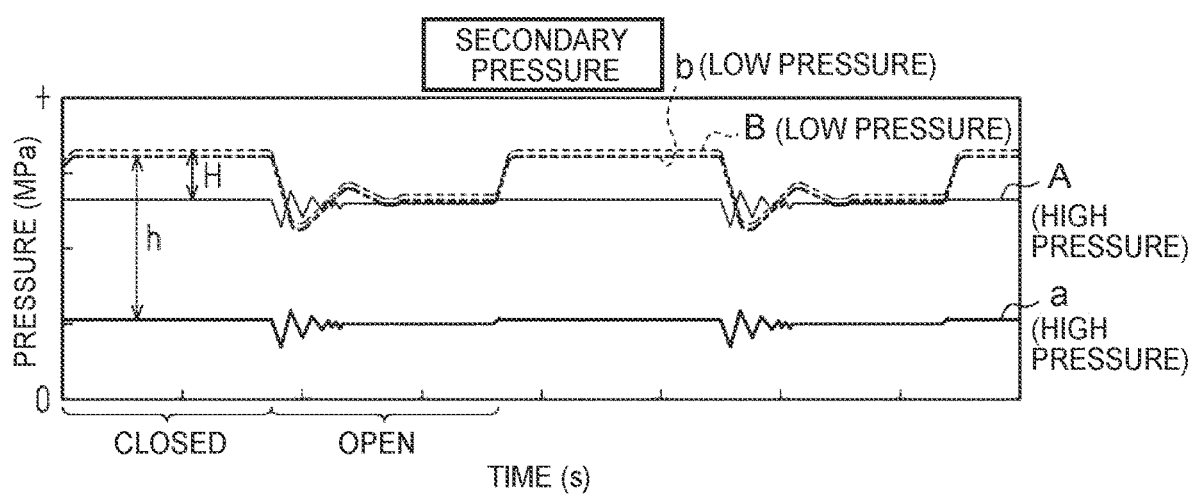
FIG. 5 is a graph illustrating changes in secondary pressure in the pressure reducing valve of the first embodiment and a pressure reducing valve of a comparative example.

A first embodiment of the disclosure will be described with reference to FIGS. 1 to 5. A pressure reducing valve (regulator) 1 shown in FIG. 1 is disposed in a fluidic circuit connecting a hydrogen tank and a fuel cell which are mounted on a fuel cell vehicle. The pressure reducing valve 1 reduces the pressure of a high pressure hydrogen gas (e.g., a maximum of about 87.5 MPa) to a lower pressure (e.g., about 4 MPa) to feed the hydrogen gas with the reduced pressure toward the fuel cell.

The pressure reducing valve 1 includes a housing 4, a valve mechanism 5, and a pressing mechanism 6. The housing 4 has a primary port 2 and a secondary port 3. The valve mechanism 5 is provided between the primary port 2 and the secondary port 3 in the housing 4. The pressing mechanism 6 adjusts the amount of opening (opening degree) of the valve mechanism 5.

The housing 4 has a round hole-shaped cylinder chamber 11. The cylinder chamber 11 communicates with the primary port 2 and the secondary port 3 and is open to the outside. Specifically, a supply flow path 12 forms a gas flow path extending from the primary port 2, and communicates with the cylinder chamber 11 via an opening 11b. The opening 11b extends through the center of a valve mechanism accommodating chamber 7 and the center of a bottom wall 11a of the cylinder chamber 11. The valve mechanism accommodating chamber 7 is disposed coaxially with the opening 11b and the supply flow path 12 and has a circular cross section having a larger inside diameter than the inside diameters of the opening 11b and the supply flow path 12.

An opening for a feed flow path 13 is provided in the bottom wall 11a of the cylinder chamber 11. This opening is provided at a position offset from the center (axis) of the bottom wall 11a of the cylinder chamber 11. The feed flow path 13 communicates with the secondary port 3 and forms a gas flow path. A relief valve and a joint (both not shown) are disposed in the feed flow path 13.

The valve mechanism 5 is disposed in the valve mechanism accommodating chamber 7. The valve mechanism 5 includes a valve element (poppet) 21, a valve seat 22, and a valve seat holder 23. The valve element 21 is accommodated in the supply flow path 12, the valve seat 22 is accommodated in the valve mechanism accommodating chamber 7, and the valve seat holder 23 holds the valve seat 22.

As shown in FIG. 1, the valve element 21 includes a columnar body 31, a tapered head 32, and a columnar protrusion 33. The head 32 is tapered such that an outside diameter of the head 32 decreases in a direction from the body 31 toward the downstream side (the upper side in FIG. 1). The protrusion 33 protrudes from the downstream end of the head 32. The body 31, the head 32, and the protrusion 33 are formed coaxially and integrally.

The outside diameter of the body 31 (the valve element 21) is slightly smaller than the inside diameter of the supply flow path 12, and the valve element 21 is disposed coaxially with an axis L1 in the supply flow path 12 (i.e., in a part upstream of the valve seat 22) such that the valve element 21 can move in the axial direction (the direction in which the axis L1 extends). A spring 34 such as a coil spring, which has its one end stopped by the inner surface of the supply flow path 12, is in contact with the opposite end of the body 31 from the head 32. The valve element 21 is biased toward the valve seat 22 as the spring 34 is compressed between the inner surface of the supply flow path 12 and the valve element 21. The head 32 is tapered such that its outer peripheral surface is tilted at a substantially constant tilt angle with respect to the axis L1. The protrusion 33 has a cylindrical shape with its outer peripheral surface substantially parallel to the axis L1. The protrusion 33 has a smaller diameter than the inside diameter of a valve hole 26 described later. The protrusion 33 is inserted in the valve hole 26 such that it can move (i.e., reciprocate) relative to the valve hole 26 in the direction in which the axis L1 extends. The protrusion 33 is disposed such that it always protrudes from the valve hole 26 toward the downstream side.

The valve seat 22 is press-fitted in the valve seat holder 23 such that the valve seat 22 is disposed coaxially with the axis L1 in the valve mechanism accommodating chamber 7. The valve seat 22 is made of an elastically deformable hard resin such as polyimide resin. The valve seat 22 has an annular shape and has the valve hole 26 having a circular cross section.

When the valve mechanism 5 is closed, the head 32 of the valve element 21 contacts the entire inner peripheral edge of the opening at the upstream side of the valve hole 26, and the valve hole 26 is thus closed. As shown in FIG. 1, the valve seat holder 23 has a cylindrical shape and is disposed such that it can reciprocate in the axial direction with respect to the inner peripheral surface of the valve mechanism accommodating chamber 7. The valve seat holder 23 has a circumferential groove in an outer peripheral surface thereof, and a seal member 24 such as an O-ring is fitted in the circumferential groove. The seal member 24 slidingly contacts the inner peripheral surface of the valve mechanism accommodating chamber 7 when the valve seat holder 23 reciprocates in the axial direction. A return spring 25 such as a coil spring is disposed between the valve seat holder 23 and the bottom wall 11a of the cylinder chamber 11. The valve seat holder 23 is biased in the direction away from the cylinder chamber 11 as the return spring 25 is compressed between the bottom wall 11a and the valve seat holder 23. In the valve mechanism accommodating chamber 7, the space, which is located closer to the supply flow path 12 than the valve seat holder 23 is, is a primary pressure chamber 8. The return spring 25 is an example of the biasing member.

The pressing mechanism 6 includes a lid 41, a piston 42, and a coil spring 43. The lid 41 closes the cylinder chamber 11. The piston 42 is slidably accommodated in the cylinder chamber 11. The coil spring 43 is a valve spring and is disposed in a compressed state between the lid 41 and the piston 42. The lid 41 has its outer peripheral portion screwed to the inner periphery of the cylinder chamber 11. The lid 41 is thus fixed to the housing 4. A seal member 44 such as an O-ring is fitted to the outer periphery of the lid 41 to ensure airtightness between the cylinder chamber 11 and the outside.

The piston 42 has a circular plate shape, and the outside diameter of the piston 42 is substantially equal to the inside diameter of the cylinder chamber 11. The piston 42 is accommodated in the cylinder chamber 11 such that it can slide in the axial direction within the cylinder chamber 11. The piston 42 divides the cylinder chamber 11 into an atmospheric pressure chamber 45 and a secondary pressure chamber 46. The pressure in the atmospheric pressure chamber 45 is always equal to the atmospheric pressure.

A seal member 47 such as a wear ring or a lip seal is fitted to the outer periphery of the piston 42 to ensure airtightness between the atmospheric pressure chamber 45 and the secondary pressure chamber 46. A protruding portion 48 is formed integrally with the piston 42. The protruding portion 48 extends from the center of an end face of the piston 42 toward the valve hole 26. The outside diameter of the protruding portion 48 is substantially equal to the outside diameter of the protrusion 33 of the valve element 21, and the protruding portion 48 is in contact with the protrusion 33. The valve element 21 therefore moves with the piston 42 as the piston 42 slides. The coil spring 43 is accommodated in a compressed state between the lid 41 and the piston 42. The piston 42 is biased by the coil spring 43 such that the valve element 21 is moved away from the valve seat 22, namely such that the amount of opening (opening degree) of the valve mechanism 5 increases.

The relationship among the inside diameter S1 of the valve hole 26, the outside diameter S2 of the piston 42, and the inside diameter S3 of the valve mechanism accommodating chamber 7 (the primary pressure chamber 8) is S2>S3>S1. The piston 42 slidably reciprocates within the cylinder chamber 11 according to the differential pressure between the atmospheric pressure chamber 45 and the secondary pressure chamber 46 (i.e., the difference between the pressure in the atmospheric pressure chamber 45 and the pressure in the secondary pressure chamber 46) and the biasing forces of the spring 34 and the coil spring 43.

The biasing forces of the coil spring 43 and the return spring 25, the inside diameter S1 of the valve hole 26, the outside diameter S2 of the piston 42, and the inside diameter S3 of the valve mechanism accommodating chamber 7 (the primary pressure chamber 8) are determined such that as the difference between the primary pressure in the primary pressure chamber 8 and the secondary pressure in the secondary pressure chamber 46 increases, the valve seat holder 23 moves toward the cylinder chamber 11 (the secondary pressure chamber 46) against the biasing force of the return spring 25.

When the difference between the primary pressure in the primary pressure chamber 8 and the secondary pressure in the secondary pressure chamber 46 decreases and the biasing force of the return spring 25 becomes larger than the primary pressure in the primary pressure chamber 8, the valve seat holder 23 moves toward the side opposite to the cylinder chamber 11.

The amount of opening of the valve mechanism 5 is adjusted according to the axial position of the piston 42 such that the pressure on the secondary port 3-side (i.e., the pressure in the secondary pressure chamber 46) does not become higher than a predetermined pressure. The amount of opening of the valve mechanism 5 decreases as the primary pressure in the primary pressure chamber 8, namely the pressure on the primary port 2-side (i.e., the pressure in the hydrogen tank) increases. The amount of opening of the valve mechanism 5 increases as the amount of hydrogen gas in the hydrogen tank decreases and the pressure on the primary port 2-side decreases.

Effects of the pressure reducing valve 1 configured as described above will be described. For convenience of description, it is herein assumed that, as shown in FIG. 1, with the valve element 21 being in the closed state, the primary pressure in the primary pressure chamber 8 has increased, and the valve seat holder 23 has moved toward the secondary pressure chamber 46 (toward the piston 42) against the biasing force of the return spring 25 due to a large difference between the primary pressure in the primary pressure chamber 8 and the secondary pressure in the secondary pressure chamber 46.

When the secondary port 3-side is opened in this closed valve state, the secondary pressure decreases accordingly. As the secondary pressure decreases, the piston 42 slides within the cylinder chamber 11 according to the differential pressure between the atmospheric pressure chamber 45 and the secondary pressure chamber 46 and the difference between the biasing forces of the spring 34 and the coil spring 43. The valve mechanism 5 is thus opened as shown in FIG. 2 and the amount of opening of the valve mechanism 5 is adjusted.

When the valve seat holder 23 is moved toward the secondary pressure chamber 46 (toward the piston 42) against the biasing force of the return spring 25 as described above, the piston 42 compresses the coil spring 43 to a great extent (in other words, compression of the coil spring 43 caused by the piston 42 is great). Accordingly, the situation where the amount of opening of the valve mechanism 5 is adjusted in this state is substantially equivalent to the situation where a set load of the coil spring 43 is changed as compared to the case where the coil spring 43 is in an extended state.

When the primary pressure in the primary pressure chamber 8 decreases and the difference between the primary pressure in the primary pressure chamber 8 and the secondary pressure in the secondary pressure chamber 46 decreases, the valve seat holder 23 moves toward the side opposite to the secondary pressure chamber 46 (i.e., toward the side opposite to the piston 42) due to the biasing force of the return spring 25 (see FIG. 3).

When the secondary port 3-side is opened in the closed valve state shown in FIG. 3 with the valve seat holder 23 moved toward the side opposite to the secondary pressure chamber 46 (toward the side opposite to the piston 42), the secondary pressure decreases accordingly. As the secondary pressure decreases, the piston 42 slides within the cylinder chamber 11 according to the differential pressure between the atmospheric pressure chamber 45 and the secondary pressure chamber 46 and the difference between the biasing forces of the spring 34 and the coil spring 43. The valve mechanism 5 is thus opened as shown in FIG. 4 and the amount of opening of the valve mechanism 5 is adjusted.

In this state, the piston 42 slides within the cylinder chamber 11 according to the differential pressure between the atmospheric pressure chamber 45 and the secondary pressure chamber 46 and the difference between the biasing forces of the spring 34 and the coil spring 43, and thus, the amount of opening of the valve mechanism 5 is adjusted between the open state shown in FIG. 4 and the closed state shown in FIG. 3.

When the valve seat holder 23 moves toward the side opposite to the secondary pressure chamber 46 (toward the side opposite to the piston 42) due to the biasing force of the return spring 25 as described above, the piston 42 compresses the coil spring 43 to a small extent (in other words, the compression of the coil spring 43 caused by the piston 42 is small). Accordingly, the situation where the amount of opening of the valve mechanism 5 is adjusted in this state is substantially equivalent to the situation where the amount of opening of the valve mechanism 5 is adjusted with a set load of the coil spring 43 being changed.

Simulation Test will be described. FIG. 5 shows the test results regarding the pressure reducing valve configured as described above and a pressure reducing valve of a comparative example. In the test, a change in secondary pressure was calculated by simulation.

The pressure reducing valve of the comparative example includes a valve seat fixed at the same position as the position of the valve seat moved toward the side opposite to the cylinder chamber as shown in FIGS. 3 and 4 in the configuration of the pressure reducing valve of the present embodiment. FIG. 5 shows the test results on how the secondary pressure changes with respect to the primary pressure when the pressure reducing valves of the present embodiment and the comparative example switch from the open state to the closed state, when these pressure reducing valves switch from the closed state to the open state, when these pressure reducing valves are in the closed state, and when these pressure reducing valves are in the open state.

In FIG. 5, a continuous line (thin line) A indicates a change in secondary pressure when the primary pressure is high (87.5 MPa) in the pressure reducing valve of the present embodiment. In this case, the valve seat holder 23 has moved toward the cylinder chamber 11 (toward the secondary pressure chamber 46) due to the high primary pressure, as shown in FIGS. 1 and 2.

In FIG. 5, a dashed line (thin line) B indicates a change in secondary pressure when the primary pressure is low (4 MPa) in the pressure reducing valve of the present embodiment. In this case, the valve seat holder 23 has moved toward the side opposite to the cylinder chamber 11 (toward the side opposite to the secondary pressure chamber 46) due to the low primary pressure, as shown in FIGS. 3 and 4.

In FIG. 5, a continuous line (thick line) a indicates a change in secondary pressure when the primary pressure is high (87.5 MPa) in the pressure reducing valve of the comparative example, and a dashed line (thick line) b indicates a change in secondary pressure when the primary pressure is low (4 MPa) in the pressure reducing valve of the comparative example.

As shown in FIG. 5, the variation H in secondary pressure between when the primary pressure is low and when the primary pressure is high in the pressure reducing valve configured similarly to the present embodiment and the variation h in secondary pressure between when the primary pressure is low and when the primary pressure is high in the pressure reducing valve of the comparative example satisfy H<h. This result shows that the variation in secondary pressure is reduced in the pressure reducing valve of the present embodiment.

The present embodiment has the following features. (1) The pressure reducing valve 1 of the present embodiment includes the piston 42 disposed in the cylinder chamber such that the piston 42 reciprocates; the valve element 21 that is coupled to the piston 42 and opens and closes the valve seat 22; and the coil spring 43 (valve spring) that biases the valve element 21 in the direction in which the valve element 21 is moved away from the valve seat 22. The pressure reducing valve 1 reduces the primary pressure of a fluid to the secondary pressure, the fluid flowing from the primary pressure chamber 8 into the secondary pressure chamber 46 of the cylinder chamber 11 through the clearance between the valve element 21 and the valve seat 22. The pressure reducing valve 1 further includes the valve seat holder 23 which is disposed such that the valve seat holder 23 reciprocates in the same direction as the direction in which the valve element 21 reciprocates in the primary pressure chamber 8, the valve seat holder 23 holding the valve seat 22; and the return spring 25 (biasing member) that biases the valve seat holder 23 toward the side opposite to the piston 42. In the pressure reducing valve 1, as the difference between the primary pressure and the secondary pressure increases, the valve seat holder 23 moves toward the secondary pressure chamber 46 via the valve seat 22, and thus, the set load of the coil spring 43 (valve spring) is changed.

According to the present embodiment, stability of the secondary pressure is thus achieved without increasing the piston diameter. The following is therefore also achieved. When the size of the pressure reducing valve is the same as the size in related art, the variation in secondary pressure is reduced even when the primary pressure varies as described above. When the size of the pressure reducing valve is further reduced, further reduction in variation in secondary pressure is achieved. In related art, when a gas rushes into the pressure reducing valve, the balance between the primary pressure and the secondary pressure is affected and the load on the valve seat increases. According to the present embodiment, however, the balance between the primary pressure and the secondary pressure is less affected and the load on the valve seat is reduced.

(2) In the pressure reducing valve of the present embodiment, the valve element 21 is disposed in the primary pressure chamber 8. In the present embodiment, the effects described above in (1) are therefore easily achieved in the pressure reducing valve in which the valve element 21 is disposed in the primary pressure chamber 8.

A pressure reducing valve 100 according to a second embodiment will be described with reference to FIGS. 6 to 9. The pressure reducing valve 100 includes an end member 101, a valve mechanism 103 including a valve seat 102, a housing 104, a piston 105, a coil spring 106, a joint 110, etc.

The end member 101 is made of, e.g., stainless steel and has a cylindrical shape. The end member 101 is firmly fixed to the housing 104. A stepped hole 107 extending in the axial direction (the direction in which an axis L2, namely the centerline of the housing 104, extends) is formed in the end face of the end member 101, which is opposite to the housing 104. The stepped hole 107 includes a large diameter portion 108 and a small diameter portion 109. The large diameter portion 108 is open toward the side opposite to the housing 104, and the small diameter portion 109 is open toward the housing 104. The large diameter portion 108 and the small diameter portion 109 are coaxial with each other.

The joint 110 is screwed into the large diameter portion 108 and firmly fixed therein. A seal member 101a such as a wear ring or a lip seal is attached to the end face of the joint 110 which faces the end member 101 such that the gas does not leak out of the joint 110 from this end face.

The joint 110 includes a primary port 111 and a primary pressure chamber 112. The primary port 111 is formed in the outer end of the joint 110, and the primary pressure chamber 112 has a larger diameter than the diameter of the primary port 111. The primary port 111 and the primary pressure chamber 112 are disposed coaxially with, and communicate with the small diameter portion 109 of the stepped hole 107. The primary port 111 is an inlet port through which hydrogen gas flows into the pressure reducing valve 100.

A filter 113 is disposed on the bottom side of the primary pressure chamber 112. The filter 113 allows the hydrogen gas to pass therethrough while removing foreign matter in the hydrogen gas. The valve mechanism 103 includes a valve seat holder 114 and a return spring 115. The valve seat holder 114 is located in the primary pressure chamber 112, and the return spring 115 is a biasing member disposed in the primary pressure chamber 112.

The valve seat holder 114 includes a cylinder portion 116 and a flange 117. The flange 117 projects from the peripheral surface of the end of the cylinder portion 116, which is opposite to the housing 104. The end of the cylinder portion 116, which is located on the side of the housing 104, is inserted through the small diameter portion 109 of the stepped hole 107 so as to reciprocate in the axial direction. The valve seat 102 made of a resin is fitted in the end face of this end of the cylinder portion 116. A seal member 118 such as an O-ring is attached to the outer peripheral surface of the cylinder portion 116. The cylinder portion 116 has a communication hole 116a extending along an axis thereof. The communication hole 116a communicates with the primary pressure chamber 112. The seal member 118 slidingly contacts the inner peripheral surface of the small diameter portion 109 when the valve seat holder 114 reciprocates in the axial direction.

The return spring 115 is, e.g., a disc spring etc. and is disposed between the end face of the end member 101 and the flange 117 of the valve seat holder 114. The valve seat holder 114 is biased in the direction in which the valve seat holder 114 is moved away from a cylinder chamber 121 described later as the return spring 115 is compressed between the end face of the end member 101 and the flange 117 of the valve seat holder 114.

The valve seat 102 is made of a resin and has a substantially annular shape. The valve seat 102 has a valve hole 119 extending therethrough in the axial direction. The valve hole 119 communicates with the primary pressure chamber 112 through the communication hole 116a. The housing 104 accommodates the piston 105 and a part of a lid 120. The housing 104 is made of, e.g., aluminum. The lid 120 has a flow path 128 connected to a secondary port (not shown) for the hydrogen gas from the pressure reducing valve 100. The flow path 128 communicates with a secondary pressure chamber 123, described later, in the cylinder chamber 121.

The housing 104 has the cylinder chamber 121 having a circular cross section. An outer peripheral portion of the lid 120 is screwed to the inner periphery defining the opening end of the cylinder chamber 121, and thus, the lid 120 is fixed to the housing 104. A seal member 122 such as an O-ring is attached to the outer periphery of the lid 120 to ensure airtightness between the cylinder chamber 121 and the outside.

The piston 105 is disposed in the cylinder chamber 121. The outside diameter of the piston 105 is substantially equal to the inside diameter of the cylinder chamber 121. The piston 105 is accommodated in the cylinder chamber 121 such that the piston 105 can slide in the axial direction within the cylinder chamber 121. The piston 105 divides the cylinder chamber 121 into the secondary pressure chamber 123 and an atmospheric pressure chamber 124. The pressure in the atmospheric pressure chamber 124 is always equal to the atmospheric pressure. A seal member 125 such as a wear ring or a lip seal is attached to the outer periphery of the piston 105 to ensure airtightness between the atmospheric pressure chamber 124 and the secondary pressure chamber 123. A protruding portion 126 is formed integrally with the piston 105. The protruding portion 126 extends from the center of an end face of the piston 105 toward the valve hole 119.

In the center of the atmospheric pressure chamber 124, a cylinder portion 131 with a circular cross section is provided. The protruding portion 126 is inserted into an inner cavity 132 of the cylinder portion 131 such that the protruding portion 126 reciprocates in the axial direction. The inner cavity 132 communicates with the valve hole 119. A seal member 133 such as a wear ring or a lip seal is attached to the outer periphery of the protruding portion 126 such that the gas in the inner cavity 132 on the side of the valve hole 119 does not leak into the atmospheric pressure chamber 124.

A flow path 129 extending in the axial direction is provided in the piston 105 and the protruding portion 126. One end of the flow path 129 is open at the end face of the piston 105 and communicates with the secondary pressure chamber 123. The other end of the flow path 129 communicates with the inner cavity 132 on the side of the valve hole 119 via a flow path 130 extending perpendicularly to the axis L2.

A valve element 127 is located at the distal end of the protruding portion 126. The valve element 127 includes a body 134 and a seal portion 135. The body 134 has a smaller diameter than the diameter of the inner cavity 132 on the side of the valve hole 119, and the seal portion 135 comes into and out of contact with the edge defining the valve hole 119. As the piston 105 slides, the valve element 127 moves with the piston 105 to come into and out of contact with the valve seat 102. The coil spring 106 is accommodated in a compressed state between the piston 105 and the bottom wall of the atmospheric pressure chamber 124, which is located on the side opposite to the lid 120.

The coil spring 106 biases the piston 105 such that the seal portion 135 of the valve element 127 is moved away from the valve seat holder 114, that is, such that the amount of opening (opening degree) of the valve mechanism 103 increases. The relationship among the inside diameter of the valve hole 119, the outside diameter of the piston 105, and the inside diameter of the primary pressure chamber 112 is the outside diameter of the piston 105>the inside diameter of the primary pressure chamber 112>the inside diameter of the valve hole 119.

The piston 105 slidably reciprocates within the cylinder chamber 121 according to the differential pressure between the atmospheric pressure chamber 124 and the secondary pressure chamber 123 (i.e., the difference between the pressure in the atmospheric pressure chamber 124 and the pressure in the secondary pressure chamber 123) and the biasing forces of the return spring 115 and the coil spring 106. The biasing forces of the coil spring 106 and the return spring 115, the inside diameter of the valve hole 119, the outside diameter of the piston 105, and the inside diameter of the primary pressure chamber 112 are determined such that the difference between the primary pressure in the primary pressure chamber 112 and the secondary pressure in the secondary pressure chamber 123 increases, the valve seat holder 114 moves toward the cylinder chamber 121 (i.e., toward the secondary pressure chamber 123) against the biasing force of the return spring 115.

When the difference between the primary pressure in the primary pressure chamber 112 and the secondary pressure in the secondary pressure chamber 123 decreases and the biasing force of the return spring 115 becomes larger than the primary pressure in the primary pressure chamber 112, the valve seat holder 114 moves toward the side opposite to the cylinder chamber 121.

The amount of opening of the valve mechanism 103 is adjusted according to the axial position of the piston 105 such that the pressure on the secondary port-side (the pressure in the secondary pressure chamber 123) does not become higher than a predetermined pressure. The amount of opening of the valve mechanism 103 decreases as the primary pressure in the primary pressure chamber 112, namely the pressure on the primary port 111-side (the pressure in a hydrogen tank) increases. The amount of opening of the valve mechanism 103 increases as the amount of hydrogen gas in the hydrogen tank decreases and the pressure on the primary port 111-side decreases.

Figure 6:
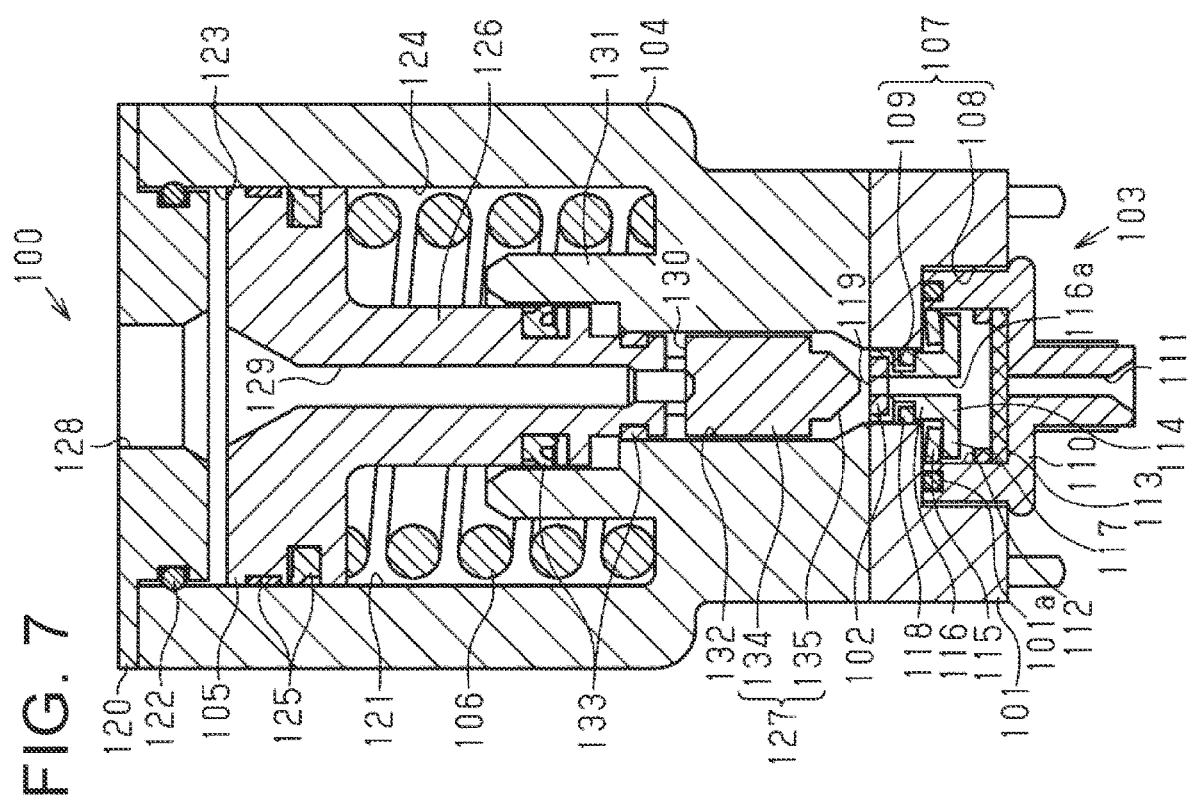
FIG. 6 is a sectional view of a pressure reducing valve of a second embodiment which is in a closed state with a valve seat holder moved toward a cylinder chamber due to a large difference between a primary pressure and a secondary pressure.

Effects of the pressure reducing valve 100 configured as described above will be described. For convenience of description, it is herein assumed that, as shown in FIG. 6, with the valve element 127 being in the closed state, the primary pressure in the primary pressure chamber 112 has increased, and the valve seat holder 114 has moved toward the secondary pressure chamber 123 (toward the piston 105) against the biasing force of the return spring 115 due to a large difference between the primary pressure in the primary pressure chamber 112 and the secondary pressure in the secondary pressure chamber 123.

Figure 7:
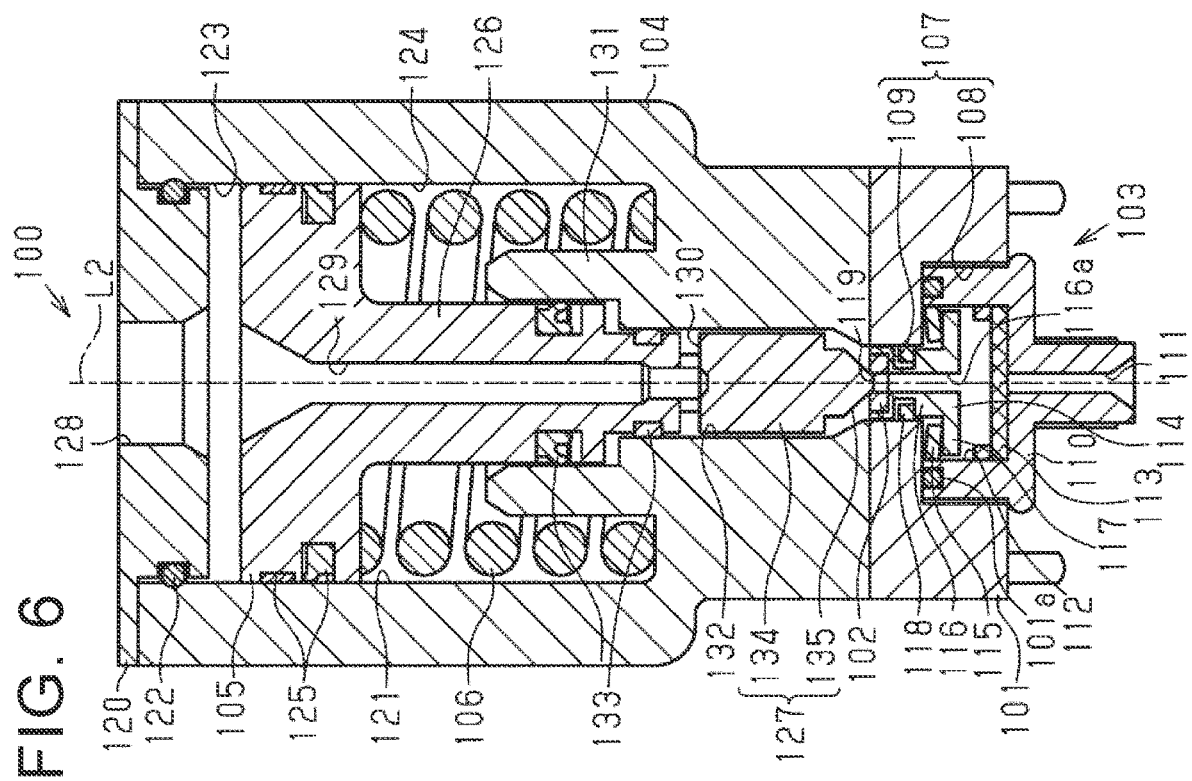
FIG. 7 is a sectional view of the pressure reducing valve of the second embodiment which is opened with the valve seat holder moved toward the cylinder chamber due to a large difference between the primary pressure and the secondary pressure.

When the secondary port-side is opened in this closed valve state, the secondary pressure decreases accordingly. As the secondary pressure decreases, the piston 105 slides within the cylinder chamber 121 according to the differential pressure between the atmospheric pressure chamber 124 and the secondary pressure chamber 123 and the biasing force of the coil spring 106. The valve mechanism 103 is thus opened as shown in FIG. 7 and the amount of opening of the valve mechanism 103 is adjusted.

When the valve seat holder 114 moves toward the secondary pressure chamber 123 (toward the piston 105) against the biasing force of the return spring 115 as described above, the piston 105 allows the coil spring 106 to extend to a greater extent. Accordingly, the situation where the amount of opening of the valve mechanism 103 is adjusted in this state is substantially equivalent to the situation where the set load of the coil spring 106 is changed as compared to the case where the coil spring 106 is in a compressed state.

Figure 8:
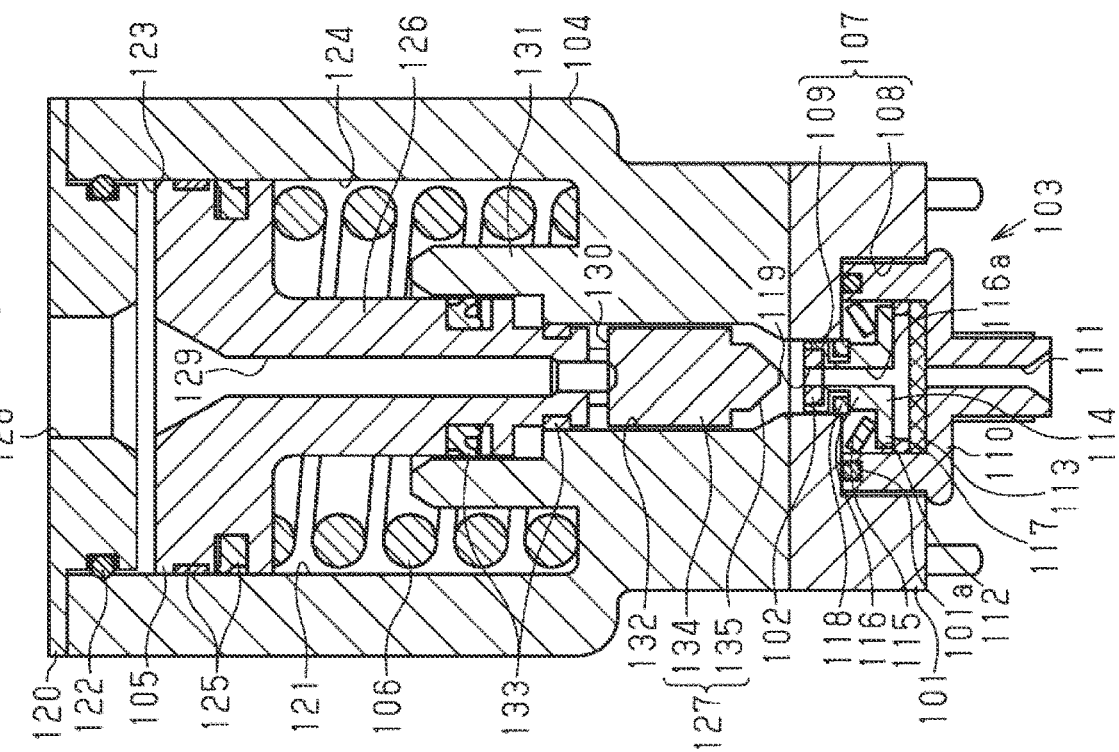
FIG. 8 is a sectional view of the pressure reducing valve of the second embodiment which is in a closed state with the valve seat holder moved toward the side opposite to the cylinder chamber due to a small difference between the primary pressure and the secondary pressure.

When the primary pressure in the primary pressure chamber 112 decreases and the difference between the primary pressure in the primary pressure chamber 112 and the secondary pressure in the secondary pressure chamber 123 decreases, the valve seat holder 114 moves toward the side opposite to the secondary pressure chamber 123 (toward the side opposite to the piston 105) due to the biasing force of the return spring 115 (see FIG. 8).

When the secondary port-side is opened in the closed valve state shown in FIG. 8 with the valve seat holder 114 moved toward the side opposite to the secondary pressure chamber 123 (toward the side opposite to the piston 105), the secondary pressure decreases accordingly. As the secondary pressure decreases, the piston 105 slides within the cylinder chamber 121 according to the differential pressure between the atmospheric pressure chamber 124 and the secondary pressure chamber 123 and the biasing force of the coil spring 106. The valve mechanism 103 is thus opened as shown in FIG. 9 and the amount of opening of the valve mechanism 103 is adjusted.

Figure 9:
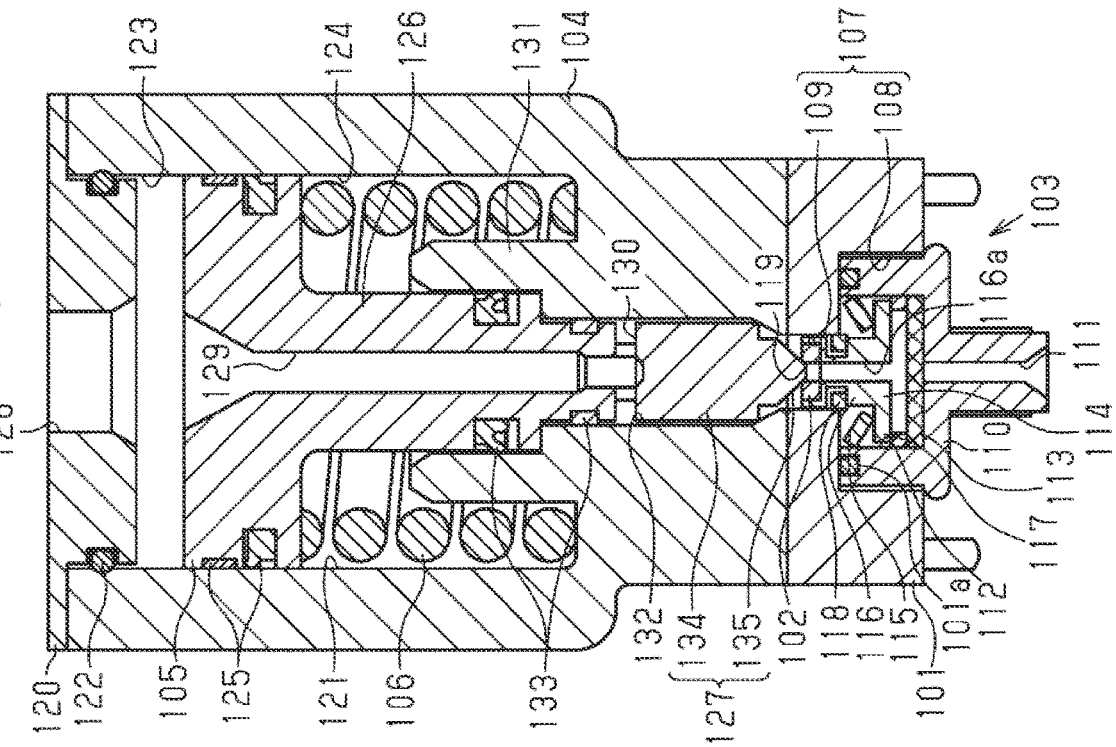
FIG. 9 is a sectional view of the pressure reducing valve of the second embodiment which is opened with the valve seat holder moved toward the side opposite to the cylinder chamber due to a small difference between the primary pressure and the secondary pressure.

In this state, the piston 105 slides within the cylinder chamber 121 according to the differential pressure between the atmospheric pressure chamber 124 and the secondary pressure chamber 123 and the biasing force of the coil spring 106, and thus, the amount of opening of the valve mechanism 103 is adjusted between the open state shown in FIG. 9 and the closed state shown in FIG. 8.

When the valve seat holder 114 moves toward the side opposite to the secondary pressure chamber 123 (toward the side opposite to the piston 105) due to the biasing force of the return spring 115 as described above, the piston 105 compresses the coil spring 106 to a great extent (i.e., the compression of the coil spring 106 caused by the piston 105 is great). Accordingly, the situation where the amount of opening of the valve mechanism 103 is adjusted in this state is substantially equivalent to the situation where the amount of opening of the valve mechanism 103 is adjusted with a set load of the coil spring 106 being changed.

The present embodiment has the following feature. (1) In the pressure reducing valve of the present embodiment, the valve element 127 is disposed at a position closer to the secondary pressure chamber than the valve seat 102. In the present embodiment, the effects of the first embodiment described above in (1) are therefore easily achieved in the pressure reducing valve in which the valve element 127 is disposed at a position closer to the secondary pressure chamber than the valve seat 102.

Embodiments of the disclosure are not limited to the above embodiments and may be modified as follows. In the first embodiment, a stopper that stops movement of the valve seat holder 23 when the valve seat holder 23 is moved by the biasing force of the return spring 25 may be provided on the bottom side of the primary pressure chamber 8.

The fluid whose pressure is to be reduced by the pressure reducing valve of the embodiment may be a gas, a fluid other than a gas, such as a vapor, or a liquid such as water or oil. In the above embodiments, the valve seat holders 23, 114 may be omitted, and the valve seat may be directly biased toward the side opposite to the piston by the biasing member.

What is claimed is:

1. A pressure reducing valve comprising: an end member;
a housing directly attached to an external surface of the end member;
   a joint including a primary pressure chamber;
   a cylinder chamber having a secondary pressure chamber, wherein the joint is directly attached to the end member;
   a piston disposed in the cylinder chamber such that the piston reciprocates;
   a valve element that is coupled to the piston and opens and closes a valve seat, the valve element being disposed at a position closer to the secondary pressure chamber than the valve seat;
   a valve seat holder holding the valve seat and being movable together with the valve seat;

a valve spring that biases the valve element in a direction in which the valve element is moved away from the valve seat; and a spring disposed in the primary pressure chamber of the joint, the spring biasing the valve seat in a direction in which the valve seat holder is moved away from the cylinder chamber toward a side opposite to the piston, wherein:

the pressure reducing valve reduces a primary pressure of a fluid in the joint to a secondary pressure, the fluid flowing from the primary pressure chamber of the joint into the secondary pressure chamber of the cylinder chamber through clearance between the valve element and the valve seat, the valve seat is disposed in the primary pressure chamber, and the valve seat reciprocates in the same direction as a direction in which the valve element reciprocates, and as a difference between the primary pressure and the secondary pressure increases, the valve seat moves toward the secondary pressure chamber.

\* \* \* \* \*